United States Patent

Budris et al.

[11] 3,730,119
[45] May 1, 1973

[54] FLOATING DEBRIS RECOVERY BASKET

[75] Inventors: Allan R. Budris, Nutley; Tadeusz A. Tokarczyk, Mount Arlington, both of N.J.

[73] Assignee: Worthington Corporation, Harrison, N.J.

[22] Filed: Jan. 6, 1971

[21] Appl. No.: 104,350

[52] U.S. Cl. ................................. 114/.5 R, 210/242
[51] Int. Cl. .............................................. B63b 35/32
[58] Field of Search ................... 114/.5 R, .5 F, .5 T, 114/27, 28, 30, 31, 43.5; 210/242, DIG. 21

[56] References Cited

UNITED STATES PATENTS 3,268,081  8/1966  Menkee et al. ........................ 210/242
3,537,413  11/1970  Farrell ................................. 114/43.5
3,083,665  4/1963  Steidley ............................... 114/.5 F
3,237,774  3/1966  Schuback .......................... 114/.5 R X Primary Examiner—Milton Buchler
Assistant Examiner—Stuart M. Goldstein
Attorney—Lerner, David & Littenberg

[57] ABSTRACT

A floating debris recovery basket is disclosed which is particularly useful in combination with a highly maneuverable catamaran type vessel. The basket is removably secured to the vessel and located between the twin hulls thereof. When the container-like basket is filled with debris, the vessel backs away from the basket leaving it floating for subsequent removal. Floatation of the basket is preferably accomplished by filling hollow side walls thereof with buoyant material.

12 Claims, 3 Drawing Figures

Patented May 1, 1973

INVENTORS:
ALLAN R. BUDRIS
TADEUSZ A. TOKARCZYK

BY

LERNER, DAVID & LITTENBERG

ATTORNEYS

Patented May 1, 1973 3,730,119

FLOATING DEBRIS RECOVERY BASKET

FIELD OF THE INVENTION

This invention relates to debris removal from bodies of water such as lakes, rivers, etc., and more particularly to a floating debris recovery basket which is particular useful in conjunction with a catamaran type vessel.

BACKGROUND OF THE INVENTION

The general practice in the recovery of floating debris or trash is to use a conveyor belt or similar type of mechanical device to load the debris on the deck or other convenient storage area of a debris recovery vessel. The trash is then unloaded from the deck of the boat by a crane or similar shore installation. Not only are such systems expensive from the point of view of the labor involved, but further, such prior art systems are extremely slow because of the continual loading and unloading operations and the waiting time involved at the shore facility.

SUMMARY OF THE INVENTION

In contradistinction to the prior art, the instant invention includes a floating debris recovery basket in which floating trash or debris can be gathered, contained, stored, and transported in a most simple and efficient manner. More specifically, the instant invention includes a generally rectangular basket-like structure having side walls thereof filled with buoyant material so that the entire trash basket is buoyant when in the water. Preferably, the basket is designed to cooperate with a highly maneuverable catamaran type vessel having a pair of hulls between which is disposed and removably secured the floating basket. Preferably, the catamaran further includes a pair of forwardly extending bow wings which help guide the debris into the basket disposed between the hulls of the craft.

In operation, as the craft moves forward, the trash is guided into the recovery basket until such time as the recovery basket is full. At that time the front gates of the basket are closed, the basket is detached from the catamaran, and the catamaran withdraws backward leaving the contained trash floating in the trash basket ready for towing, storing and unloading either then or at some subsequent point in time.

As an advantageous feature of the invention, the debris recovery basket is of such dimensions that the basket does not extend lower than the hulls of the catamaran, thus allowing the boat to maneuver in shallow and restricted areas which would not be possible if a net or similar device was being pulled behind or by the side of the boat.

Accordingly, it is an object of the instant invention to provide a floating debris recovery basket.

Another object of the instant invention is to provide such a floating debris recovery basket which is useful in conjunction with a watercraft, preferably of the twin hull catamaran type.

Yet another object of the instant invention is to provide such a floating debris recovery basket which is removably secured to the vessel with which it is intended to cooperate.

These and other objects of the instant invention may be had by referring to the following description and drawings in which.

Figure 1:
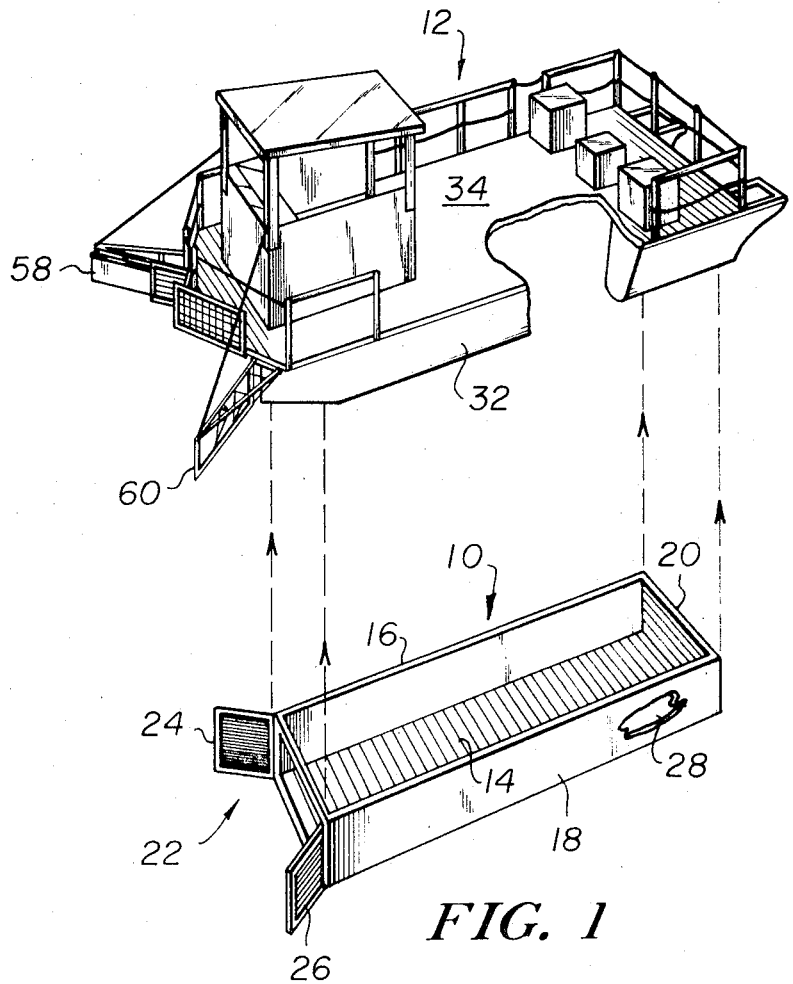
FIG. 1 is an exploded perspective view, with a portion thereof removed, of the debris recovery basket of the instant invention, and further illustrating the manner in which such basket is intended to cooperate with a vessel of the twin hull catamaran type.
Figure 2:
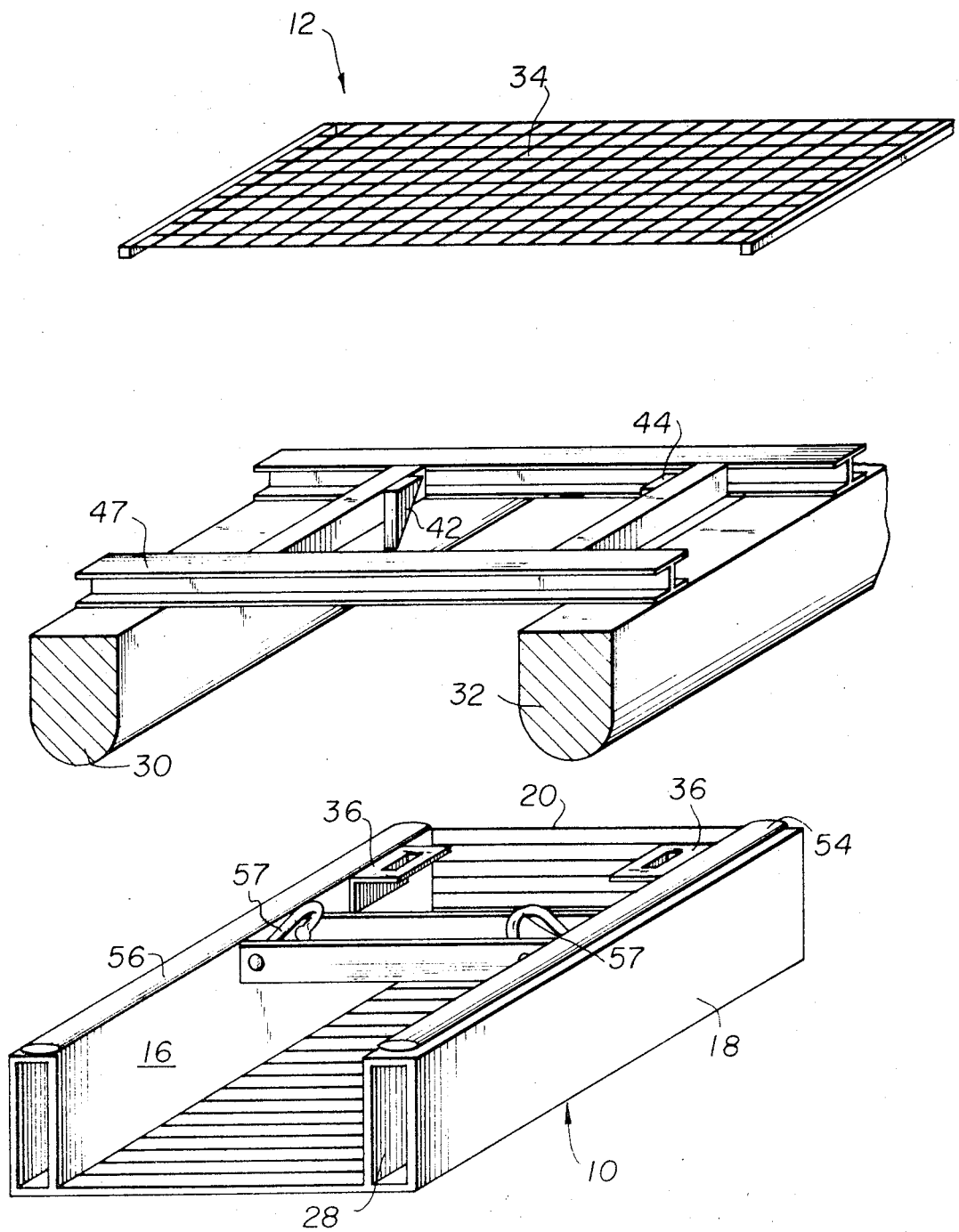
FIG. 2 is an exploded perspective view, partly in section, illustrating the manner in which the floating debris recovery basket of the instant invention cooperates with a portion of the craft shown in FIG. 1.

Turning to the Figures, there is shown in FIGS. 1 and 2 the floating debris recovery basket 10 of the instant invention and the manner in which it it intended to cooperate with a vessel 12 preferably of the twin hulled catamaran type. Before going into detail, it might be pointed out that the craft 12 may be of the type disclosed and claimed in detail in U.S. Pat. application Ser. No. 7,650 filed Feb. 20, 1970 entitled "Watercraft Especially Useful for the Recovery of Oil" and assigned to the assignee of the instant invention. Of course, the craft 12 need not be of the type disclosed in the aforementioned application; but in the most preferred embodiment of the instant invention, the craft 12 should be of the catamaran type such that the basket 10 may operate in the manner to be further described. Of course, and going even one step further, although not recommended as the most advantageous form of usage, the basket 10 could be employed as a trash recovery basket simply by pushing it ahead of, or pulling it behind of, or along side of a suitable craft such as an ordinary tug boat.

The basket 10 includes a bottom wall 14, a pair of side walls 16, 18, rear wall 20, and movable front wall means 22 to be described in greater detail. Additionally, although not illustrated in the drawings, if desired, the basket can have an upper wall closing in the basket 10 much like an elongated box.

As illustrated in the drawings, the bottom wall 14, the rear wall 20, and the front wall means 22 are constructed of a screen-like material having openings which are large enough to permit the passage of water therethrough but small enough to restrain the debris which is to be gathered by the basket 10. In the preferred embodiment illustrated in the drawings, the screen-like construction takes the form of elongated bars forming a grating, but of course, any equivalent structure can be employed. The front wall means preferably includes a pair of swinging gates which remain open when the basket is receiving the trash or debris and can be conveniently closed and locked when it is desirable to containerize the debris for storage and subsequent transport within the basket 10.

To achieve the desired buoyancy for the basket 10, the side walls 16 and 18 preferably include hollow interior pockets 28 which generally extend for the entire length of the side walls. Such pockets are filled with buoyant material, preferably polyurethane foam, such that the entire basket 10 will float at a predetermined level of submergence when removed from the craft 12. It should be pointed out that the weight of the debris will normally not affect the level of flotation since the basket is used mainly to pick up floating debris.

As indicated previously, the floating debris recovery basket 10 is preferably employed in conjunction with a catamaran type vessel, and in a manner to be further described is removably securable with respect thereto. In operation, the basket 10 is situated in a nestled position between the twin hulls 30 and 32 of the craft disposed beneath the deck 34 thereof (FIG. 2). Preferably, the height or depth of the basket 10 is no greater than the height or depth of hulls 30 and 32, such that in use, no portion of the basket extends beneath the bottom of the hulls 30, 32 and cannot in any way impair the high maneuverability of the craft.

Figure 3:
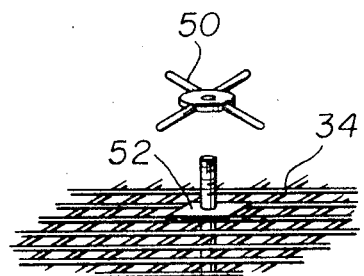
FIG. 3 is an exploded perspective view illustrating one preferred embodiment for securing the recovery basket of the instant invention to the craft with which it is intended to cooperate.

For securing the basket 10 to the craft 12, the side walls 16 and 18 are provided with inwardly extending generally L-shaped members 36, the inwardly turned upper portions 38 of which are provided with elongated slots 40 (FIG. 3). When it is desirable to secure the basket 10 between the hulls 30 and 32 of the craft, the craft 12 is propelled forwardly over the basket 10 until the rear wall 20 thereof abuts a pair of stops 42, 44 suspended from the super structure 47 of the craft. At that time, and with reference to FIG. 3, elongated "T" shaped bolts 46 are dropped through the intersticial openings in the grating type deck 34 which are most nearly above the respective elongated slots 40 therebeneath; the cross piece 48 of each of the bolts 46 is slipped through the slot 40; turned 90° (as illustrated in phantom 48' in FIG. 3); and wing nuts 50 are threaded on the shank of the "T" bolts 46 with the aid of generally rectangular washers 52 disposed between the deck-grating 34 and the wing nut 50. As the four wing nuts 50 are tightened, the basket 10 is lifted up into tight engagement with the undersurface of the super structure 47. To prevent damage, generally flattened out rubber hose elements 54 and 56 are secured along the upper edges of the side panels 16 and 18. Rubber bumpers may also be installed on the underside of the superstructure 47 to prevent damage. Lifting lugs 57 are provided to facilitate the removal of the basket from the water, and unloading.

Preferably, the craft 12 includes a pair of forwardly and outwardly extending bow wings 58 and 60 which help guide and funnel the trash into the basket 10 secured between the hulls 30 and 32 in its nestled position. This trash collection process continues until the basket 10 is filled at which time the front gates 24, 26 are closed and locked; the basket unsecured from the craft 12; and the craft 12 "backed-off" leaving the contained trash in the floating basket 10 ready for subsequent towing, storing, unloading, etc. While the filled basket is awaiting pick-up, the craft 12 can maneuver itself forward onto another empty basket 10 whereby the process can be repeated with waiting time completely eliminated.

Although this invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

We claim:

1. In combination
   an independently floatable debris recovery basket having a predetermined width;
   a catamaran type vessel having a deck and a pair of hulls spaced apart by a distance greater than said predetermined width;
   said vessel having propulsion means thereon whereby said vessel can be moved relative to said basket such that said basket can occupy a free position outside the confines of said hulls and a nestled position within the confines of said hulls;
   stop means provided on said vessel for stopping the relative movement between said vessel and said basket to establish said nestled position; and
   fastening means for removably securing said basket to said vessel when said basket occupies said nestled position.

2. The combination of claim 1 wherein said basket comprises
   a bottom;
   a pair of side walls upstanding from said bottom along opposite sides thereof;
   a rear wall;
   front wall means; and
   floatation means cooperatively associated with said side walls for floating said basket.

3. The debris recovery basket of claim 2 wherein said side walls including pockets therein; and said floatation means includes buoyant material located in said pockets.

4. The debris recovery basket of claim 3 wherein said buoyant material comprises polyurethane foam.

5. The debris recovery basket of claim 2 wherein said bottom, said rear wall, and said front wall means include major surface area porous to fluid.

6. The debris recovery basket of claim 5 wherein said major surface areas comprise screening having intersticial spaces permitting the passage of fluid therethrough.

7. The debris recovery basket of claim 5 wherein said front wall means is movable between open and closed positions with respect to said side walls.

8. The debris recovery basket of claim 5 wherein said front wall means comprises first and second gates swingly secured to respective ones of said pair of side walls and movable between open and closed positions with respect to one another and said side walls.

9. The combination of claim 2 wherein said hulls have a predetermined height and wherein said side walls are of a height less than said predetermined height and are spaced apart by a distance less than said predetermined width.

10. The combination of claim 1 wherein said deck comprises a screen-like structure having a plurality of intersticial openings therethrough; and said fastening means includes elongated fastening elements removably securable at one end thereof to predetermined locations on said basket; said fastening elements being selectively inserted through those of said intersticial openings which are most closely situated with respect to said predetermined locations on said basket.

11. The combination of claim 1 and further including a pair of bow wings movably secured to said pair of hulls respectively for guiding debris into said basket.

12. For use with a catamaran type vessel having: a deck and a pair of hulls spaced apart by a predetermined distance, propulsion means for driving said vessel, and stop means positioned between said hulls to establish a nestled position for a floatable debris recovery basket slid between said hulls; the improvement comprising an independently floatable debris recovery basket slidable relative to said hulls between a free position outside the confines of said hulls and a nestled position established by said stop means; and fastening means for removably securing said basket to said vessel when said basket occupies said nestled position.

* * * * *